(12) United States Patent
Bose et al.

(10) Patent No.: US 9,354,943 B2
(45) Date of Patent: May 31, 2016

(54) POWER MANAGEMENT FOR MULTI-CORE PROCESSING SYSTEMS

(71) Applicant: International Business Machines Corporation, Armonk, NY (US)

(72) Inventors: Pradip Bose, Yorktown Heights, NY (US); Alper Buyuktosunoglu, White Plains, NY (US); Michael S. Floyd, Cedar Park, TX (US); Heather L. Hanson, Austin, TX (US); Hans M. Jacobson, White Plains, NY (US); Karthick Rajamani, Austin, TX (US); Srinivasan Ramani, Cary, NC (US); Todd J. Rosedahl, Zumbrota, MN (US); Augusto J. Vega, Astoria, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

(21) Appl. No.: 14/219,550

(22) Filed: Mar. 19, 2014

(65) Prior Publication Data
US 2015/0268710 A1     Sep. 24, 2015

(51) Int. Cl.
*G06F 1/32*      (2006.01)
*G06F 9/50*      (2006.01)

(52) U.S. Cl.
CPC ............ *G06F 9/5094* (2013.01); *G06F 1/3243* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 5,892,959 A | 4/1999 | Fung | |
| 6,006,336 A | 12/1999 | Watts, Jr. et al. | |
| 7,134,031 B2 * | 11/2006 | Flautner | G06F 1/3203 307/82 |
| 8,010,817 B2 * | 8/2011 | Chu | G06F 1/26 713/323 |
| 8,250,395 B2 * | 8/2012 | Carter | G06F 1/324 709/248 |
| 8,689,021 B1 * | 4/2014 | Bai | G06F 1/28 713/300 |
| 8,695,008 B2 * | 4/2014 | Regini | G06F 9/5094 713/322 |
| 2002/0188877 A1 * | 12/2002 | Buch | G06F 1/3203 713/320 |
| 2009/0249094 A1 * | 10/2009 | Marshall | G06F 1/3203 713/320 |

OTHER PUBLICATIONS

ACPI Overview, retrieved from the internet: http://www.acpi.info/presentations/ACPI_Overview.pdf, Apr. 2013, 10 pages.
(Continued)

*Primary Examiner* — Zahid Choudhury
(74) *Attorney, Agent, or Firm* — Cantor Colburn LLP (57) ABSTRACT

According to an aspect, power management of a multi-core processing system includes determining workload characteristics in the multi-core processing system. A power adjustment scenario is identified based on the workload characteristics. A predetermined actuation order for at least two power adjustment actuators is identified based on the power adjustment scenario. Based on the predetermined actuation order, it is determined whether there is an adequate adjustment capacity for a power adjustment action associated with one of the at least two power adjustment actuators. The power adjustment action is initiated based on the predetermined actuation order and determining that the adequate adjustment capacity is available.

20 Claims, 5 Drawing Sheets

(56) References Cited

OTHER PUBLICATIONS

Grace Period Disclosure__A. Vega, et al., "Crank It Up or Dial It Down: Coordinated Multiprocessor Frequency and Folding Control," MICRO-46 Proceedings of the 46th Annual IEEE/ACM International Symposium on Microarchitecture; pp. 210-221; Dec. 7, 2013.

HP Power Capping and HP Dynamic Power Capping for ProLiant Servers, Technology Brief, 2nd Edition, Jan. 2011, 25 pages.

K. Ma, et al., "PGCapping: Exploiting Power Gating for Power Capping and Core Lifetime Balancing in CMPs," International Conference on Parallel Architectures and Compilation Techniques (PACT 2012), Sep. 19-23, 2012, 10 pages.

Power Regulator for ProLiant Servers, Technology Brief, 5th Edition, Feb. 2011, 13 pages.

S. Ghiasi, et al., "CPU Packing for Multiprocessor Power Reduction," International Conference on Power-Aware Computer Systems (PACS 2003), Dec. 1, 2003, pp. 117-131.

V. Freeh, et al., "Scaling and Packing on a Chip Multiprocessor," International Parallel and Distributed Processing Symposium (IPDPS 2007), Mar. 26-30, 2007, 8 pages.

\* cited by examiner

POWER MANAGEMENT FOR MULTI-CORE PROCESSING SYSTEMS

STATEMENT REGARDING FEDERALLY SPONSORED RESEARCH OR DEVELOPMENT

This invention was made with Government support under contract number HR0011-13-C-0022 awarded by the Defense Advanced Research Projects Agency (DARPA). The Government has certain rights in this invention.

STATEMENT REGARDING PRIOR DISCLOSURES BY THE INVENTOR OR A JOINT INVENTOR

The following disclosure is submitted under 35 U.S.C. 102(b)(1)(A): DISCLOSURE: "Crank It Up or Dial It Down: Coordinated Multiprocessor Frequency and Folding Control" by Augusto Vega, Alper Buyuktosunoglu, Heather Hanson, Pradip Bose, and Srinivasan Ramani appearing in "MICRO-46 Proceedings of the 46$^{th}$ Annual IEEE/ACM International Symposium on Microarchitecture," Dec. 7, 2013, pages 210-221.

BACKGROUND

The present invention relates generally to computer systems, and more particularly to power management in a multi-core processing system.

In computer systems that include multiple processing resources for executing a plurality of tasks, distribution of task execution is important to system performance. In systems having multiple processor cores and multi-threading operation, allocation of tasks or threads among cores can affect power consumption. Power management can impact overall computer system operating costs, processing system responsiveness, and expected operating life of individual components or subsystems.

Some computer systems support dynamic power management by including multiple independent power control actuators. Power control actuators are typically incorporated into independently architected control loops with single actuators, such as a dynamic voltage and frequency scaling (DVFS) actuator, a core folding (CF) actuator, and a per-core power gating (PCPG) actuator. A DVFS actuator can control voltage and frequency of a multi-core processor. A CF actuator can control consolidation or distribution of threads in processor cores. A PCPG actuator can turn power on or off for individual processor cores. When power control actuators are deployed in the same computer system and operate independently at the same time, conflicting scenarios can result in one power control actuator negating the intended effect of another power control actuator. Decoupled power control loops can be simpler to independently test or verify; however, the net effect may not be desirable. For example, a CF controller may decide to unfold (and power on) some processor cores and as a result, the utilization of the turned-on processor cores can drop. A DVFS controller may observe the reduced utilization and lower a processor frequency to keep the processor cores highly utilized. Reducing the processor frequency may hurt performance and negate the effect intended by the CF controller.

SUMMARY

According to one embodiment, a method for power management of a multi-core processing system includes determining workload characteristics in the multi-core processing system. A power adjustment scenario is identified based on the workload characteristics. A predetermined actuation order for at least two power adjustment actuators is identified based on the power adjustment scenario. Based on the predetermined actuation order, it is determined whether there is an adequate adjustment capacity for a power adjustment action associated with one of the at least two power adjustment actuators. The power adjustment action is initiated based on the predetermined actuation order and determining that the adequate adjustment capacity is available.

According to another embodiment, a multi-core processing system includes a plurality of processor cores, at least two power adjustment actuators, and a power-aware management of processor actuators (PAMPA) controller operably coupled to the at least two power adjustment actuators. The PAMPA controller is configured to determine workload characteristics in the multi-core processing system, and identify a power adjustment scenario based on the workload characteristics. A predetermined actuation order for at least two power adjustment actuators is identified based on the power adjustment scenario. Based on the predetermined actuation order, the PAMPA controller determines whether there is an adequate adjustment capacity for a power adjustment action associated with one of the at least two power adjustment actuators. The PAMPA controller is configured to initiate the power adjustment action based on the predetermined actuation order and a determination that the adequate adjustment capacity is available.

According to a further embodiment, a computer program product for power management of a multi-core processing system is provided. The computer program product includes a tangible storage medium readable by a processing circuit and storing instructions for execution by the processing circuit to determine workload characteristics in the multi-core processing system and identify a power adjustment scenario based on the workload characteristics. A predetermined actuation order for at least two power adjustment actuators is identified based on the power adjustment scenario. Based on the predetermined actuation order, it is determined whether there is an adequate adjustment capacity for a power adjustment action associated with one of the at least two power adjustment actuators. The power adjustment action is initiated based on the predetermined actuation order and a determination that the adequate adjustment capacity is available.

DETAILED DESCRIPTION

An embodiment is directed to coordinated power management of a multi-core processing system that includes multiple power adjustment actuators. Coordinated power management can reduce potential interference attributed to independent power management control loops. A power-aware management of processor actuators (PAMPA) controller coordinates control of multiple power adjustment actuators to increase power-performance efficiency and reduce potential power actuation conflicts.

Figure 1:
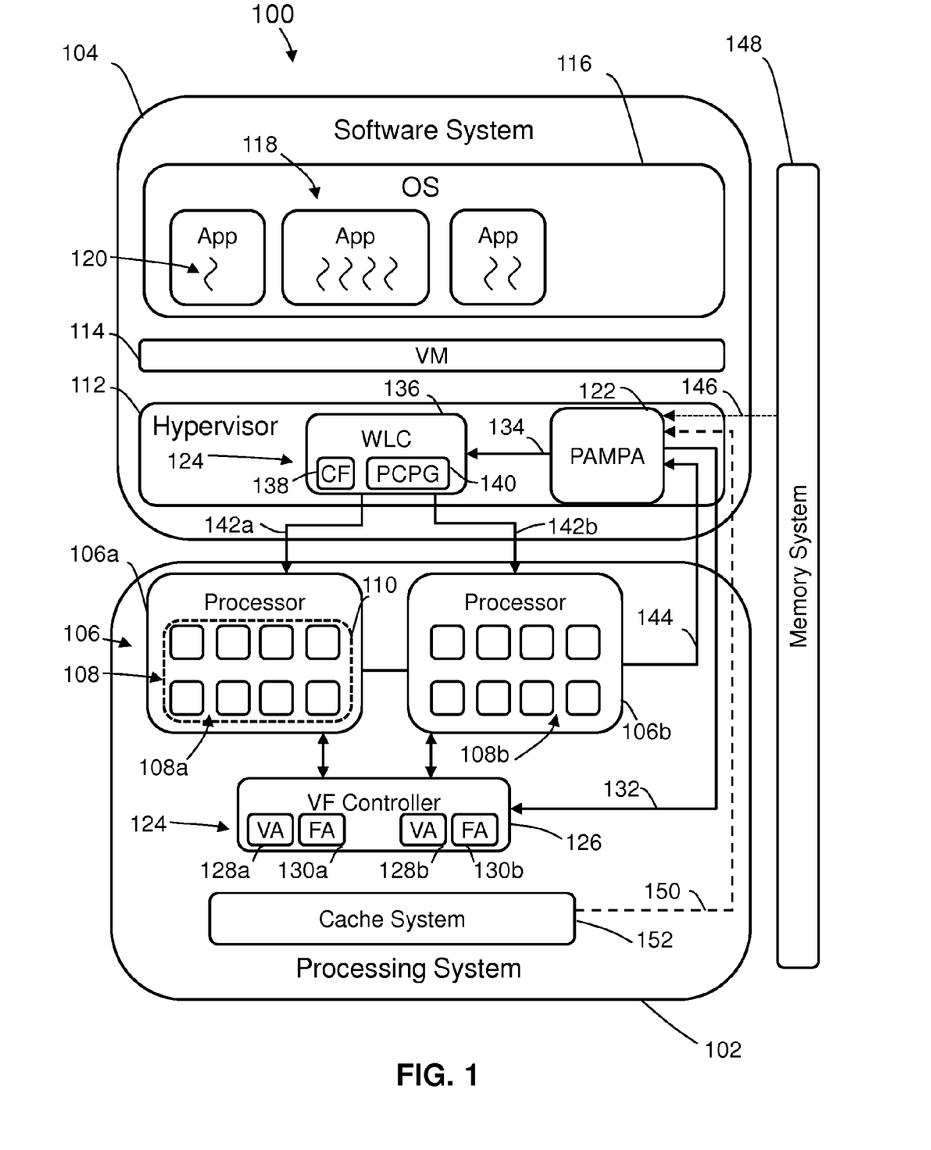
FIG. 1 illustrates a block diagram of a system in accordance with an embodiment.

Turning to FIG. 1, an example of a multi-core processing system 100 is depicted according to an embodiment. The multi-core processing system 100 includes a processing system 102 and a software system 104. The processing system 102 can include a plurality of multi-core processors 106, such as multi-core processors 106a and 106b. Each of the multi-core processors 106 includes two or more processor cores 108. In the example of FIG. 1, multi-core processor 106a includes eight processor cores 108a and multi-core processor 106b includes eight processor cores 108b. Power management can be performed on a processor basis, a core basis, and/or a power management group basis. A power management group can consider a number of the processor cores 108 for power adjustment scenario identification and a power adjustment action. In the example of FIG. 1, a power management group 110 is defined as all eight processor cores 108a of multi-core processor 106a. Alternatively, the power management group 110 could be defined for a subset of the processor cores 108a or span to include one or more of the processor cores 108b of the multi-core processor 106b. One or more separate power management groups (not depicted) may be defined for the processor cores 108b.

The software system 104 may include a hypervisor 112, a virtual machine 114, and an operating system 116. The hypervisor 112 can create and run the virtual machine 114 to provide a virtual operating platform to the operating system 116. The hypervisor 112 may also support additional virtual machines and operating systems (not depicted). The operating system 116 can support a number of applications 118 that may each include one or more threads 120. Execution of the threads 120 may be distributed between a number of the processor cores 108. In an exemplary embodiment, a power-aware management of processor actuators (PAMPA) controller 122 is configured to perform power management for the processing system 102. In the example of FIG. 1, the PAMPA controller 122 is part of the hypervisor 112 and is operably coupled to at least two power adjustment actuators 124. The power adjustment actuators 124 can be hardware or software based. In the example of FIG. 1, a voltage and frequency controller 126 is a separately configurable control device that establishes a voltage and operating frequency for the multi-core processors 106 to provide dynamic voltage and frequency scaling (DVFS). For instance, power adjustment actuators 124 in the voltage and frequency controller 126 can include a first voltage adjustment actuator 128a and a first frequency adjustment actuator 130a for the multi-core processor 106a. Power adjustment actuators 124 in the voltage and frequency controller 126 can also include a second voltage adjustment actuator 128b and a second frequency adjustment actuator 130b for the multi-core processor 106b. The PAMPA controller 122 can provide DVFS commands 132 to the voltage and frequency controller 126 to adjust a voltage and/or frequency for either or both of the multi-core processors 106. In embodiments that support multiple power management groups 110 per multi-core processor 106, additional instances of the voltage and frequency adjustment actuators 128a, 128b, 130a, 130b can be incorporated into the voltage and frequency controller 126. In an embodiment where a single power management group 110 spans all multi-core processors 106, the second voltage adjustment actuator 128b and the second frequency adjustment actuator 130b can be omitted.

The PAMPA controller 122 can also send core-level power management commands 134 to a workload consolidator 136. The workload consolidator 136 may be software based and include multiple power adjustment actuators 124. In the example of FIG. 1, the workload consolidator 136 includes a core folding (CF) actuator 138 and a per-core power gating (PCPG) actuator 140. There may be separate instances of the CF actuator 138 and the PCPG actuator 140 for each power management group 110, or the CF and PCPG actuators 138, 140 can be selectively driven to one or more specific power management group 110. In the example of FIG. 1, the PAMPA controller 122 sends the core-level power management commands 134 to the workload consolidator 136 and identifies a particular multi-core processor 106. The workload consolidator 136 drives output of either or both of the CF and PCPG actuators 138, 140 as core commands 142a to multi-core processor 106a or core commands 142b to multi-core processor 106b. In an embodiment, the CF actuator 138 shifts instances of the threads 120 between the processor cores 108, and the PCPG actuator 140 turns power to the processor cores 108 on or off. Accordingly, the PAMPA controller 122 can use the CF actuator 138 in combination with the PCPG actuator 140 to consolidate a workload (e.g., at least one of the threads 120) of at least one processor core 108 and turn off the now unused processor core(s) 108. The PAMPA controller 122 can also use the CF actuator 138 in combination with the PCPG actuator 140 to spread a workload (e.g., at least one of the threads 120) of at least one processor core 108 into at least one other processor core 108 and turn on the at least one other processor core 108 if needed.

The PAMPA controller 122 may monitor workload characteristics in the multi-core processing system 100, such as a level of processor core utilization 144 in the multi-core processors 106, to identify a power adjustment scenario and determine a power adjustment action or sequence of power adjustment actions for one or more of the power adjustment actuators 124 based on the power adjustment scenario. Each power adjustment scenario can be associated with a predetermined actuation order for at least two power adjustment actuators 124. For instance a power adjustment scenario that is single-thread-performance bound can have a different predetermined actuation order than a power adjustment scenario that is throughput bound. The PAMPA controller 122 may also use the level of processor core utilization 144 or other workload characteristics in performing a stability check to ensure that power adjustment scenario determination is based on a relatively stable current execution phase of the processor cores 108. Other inputs can be used to supplement the stability determination or as an alternate stability indicator. In one example, the PAMPA controller 122 can monitor various workload characteristics in combination with or as an alternative to the level of processor core utilization 144, such as memory system activity 146 of a memory system 148 and/or cache system activity 150 of a cache system 152. The memory system activity 146 and/or the cache system activity 150 can also or alternatively be used as an indication of a stable current phase of execution or as a proxy for an adequate adjustment capacity. For instance, if processing is likely being stalled to service a number of accesses to the memory system 148, then an operating frequency may be reduced to lower power using either the first or second frequency adjustment actuator 130a, 130b. The memory system 148 can include a combination of various types of computer readable storage media, e.g., solid-state memory, secondary storage, and the like, to store executable instructions for the software system 104 and associated data. The cache system activity 150 may be an indication of a miss rate of the cache system 152, which can result in slower accesses to the memory system 148 and thereby lowering associated processing core demands. Additionally, depending upon the particular power adjustment actuator 124, monitoring of workload characteristics and taking particular actions can occur at different rates, e.g., voltage and frequency controller 126 may support a higher update rate than the workload consolidator 136.

Figure 2:
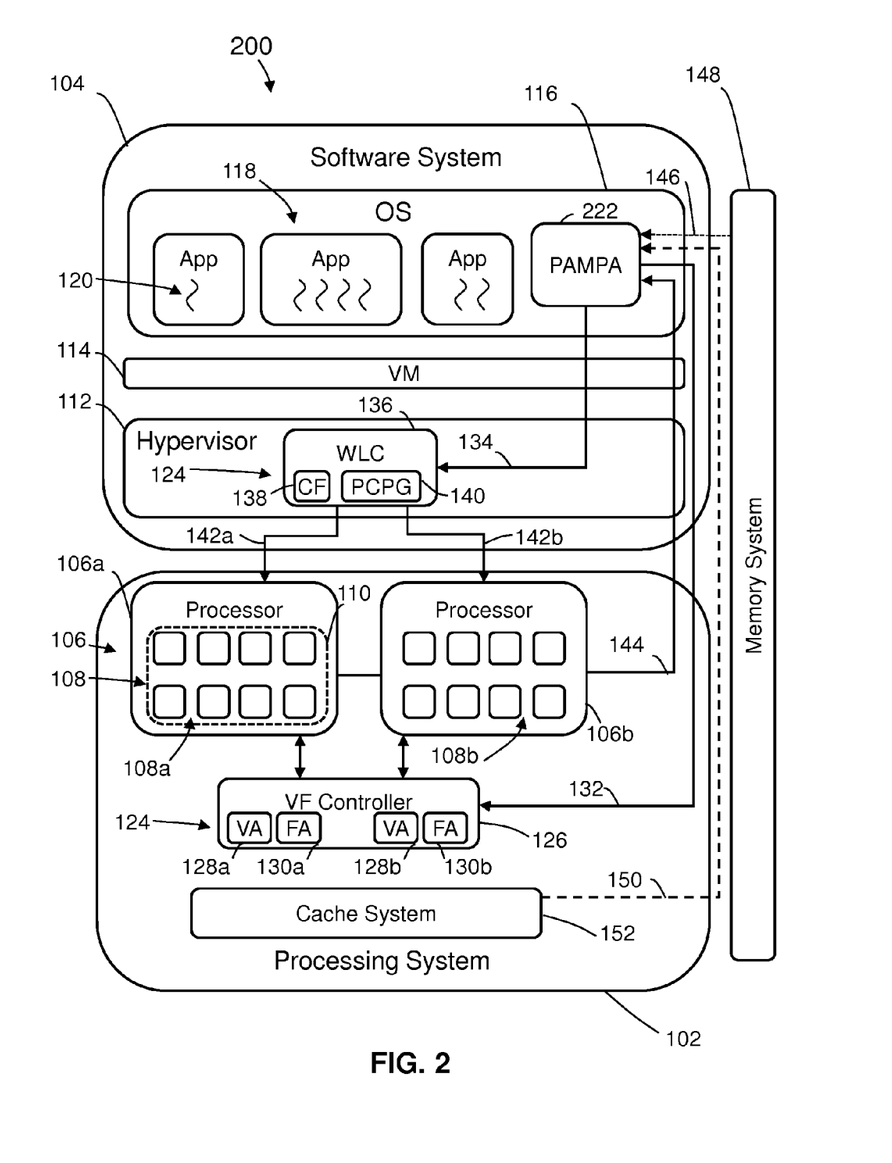
FIG. 2 illustrates a block diagram of a system in accordance with another embodiment.

FIG. 2 illustrates a block diagram of a multi-core processing system 200 in accordance with another embodiment. Similar to the multi-core processing system 100 of FIG. 1, the multi-core processing system 200 of FIG. 2 includes a processing system 102, a software system 104, a plurality of multi-core processors 106, such as multi-core processor 106a and 106b, two or more processor cores 108, a power management group 110, a hypervisor 112, a virtual machine 114, an operating system 116, a number of applications 118 that may each include one or more threads 120, power adjustment actuators 124, memory system 148 and cache system 152. Instead of including the PAMPA controller 122 in the hypervisor 112 as in the multi-core processing system 100 of FIG. 1, a PAMPA controller 222 may be implemented at an application level in the operating system 116 in the multi-core processing system 200 of FIG. 2. The PAMPA controller 222 of FIG. 2 can include substantially the same features as the PAMPA controller 122 of FIG. 1. Implementing the PAMPA controller 222 at an application level may enable simpler updates to logic and configurable thresholds in the PAMPA controller 222. In contrast, implementing the PAMPA controller 122 of FIG. 1 in the hypervisor 112 may improve response time and can provide better performance if power monitoring is performed frequently.

Figure 3:
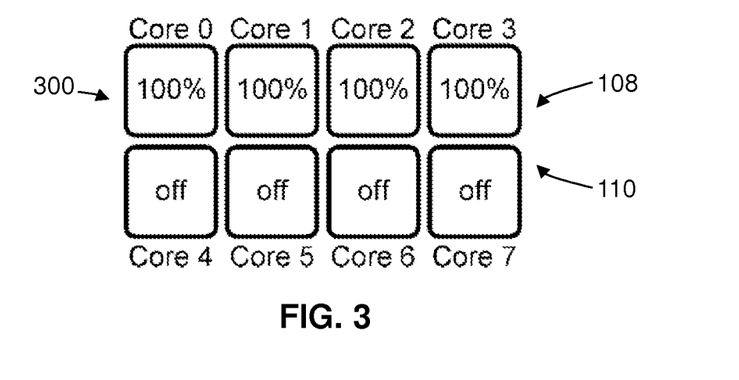
FIGS. 3-5 depict example scenarios in accordance with an embodiment.
Figure 4:
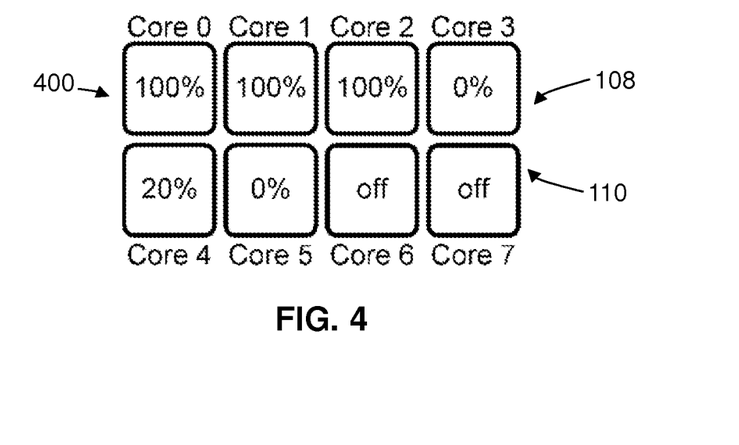
Figure 5:
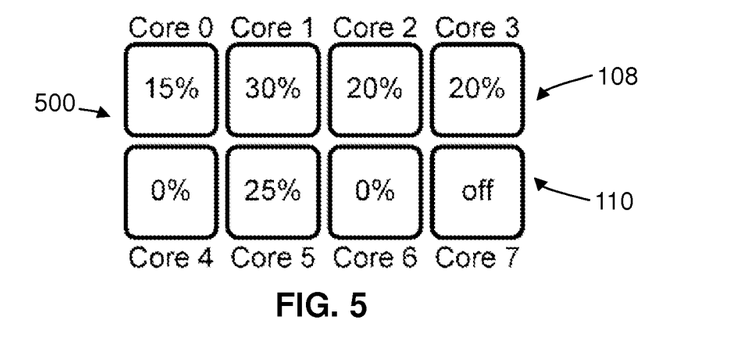

FIGS. 3-5 depict example power adjustment scenarios in accordance with an embodiment. The various percentages depicted in FIGS. 3-5 can be reported as the level of processor core utilization 144 of FIGS. 1-2 to the PAMPA controller 122 of FIG. 1 or to the PAMPA controller 222 of FIG. 2. FIG. 3 depicts an example of a first power adjustment scenario 300 for power management group 110 that includes eight processor cores 108. In the first power adjustment scenario 300, four of the processor cores 108 are turned on and active (cores 0-3), and four of the processor cores 108 are turned off (cores 4-7). As can be seen in FIG. 3, all of the turned-on processor cores (cores 0-3) are 100% utilized, indicating a high level of processor core utilization.

In an example of a second power adjustment scenario 400 in FIG. 4, six of the processor cores 108 are turned on and active (cores 0-5), and two of the processor cores 108 are turned off (cores 6-7) in the power management group 110. Three of the six turned-on processor cores (cores 0-2) are 100% utilized, but not all of the processor cores 108 in the power management group 110 are highly utilized (e.g., cores 3 and 5 at 0% and core 4 at 20%).

In an example of a third power adjustment scenario 500 in FIG. 5, seven of the processor cores 108 are turned on and active (cores 0-6), and one of the processor cores 108 is turned off (core 7) in the power management group 110. None of the seven turned-on processor cores (cores 0-6) is 100% utilized, with a 30% utilization level (core 1) being the highest level of utilization in the third scenario 500. The examples of power adjustment scenarios 300-500 of FIGS. 3-5 are further described with respect to FIGS. 6 and 7.

Figure 6:
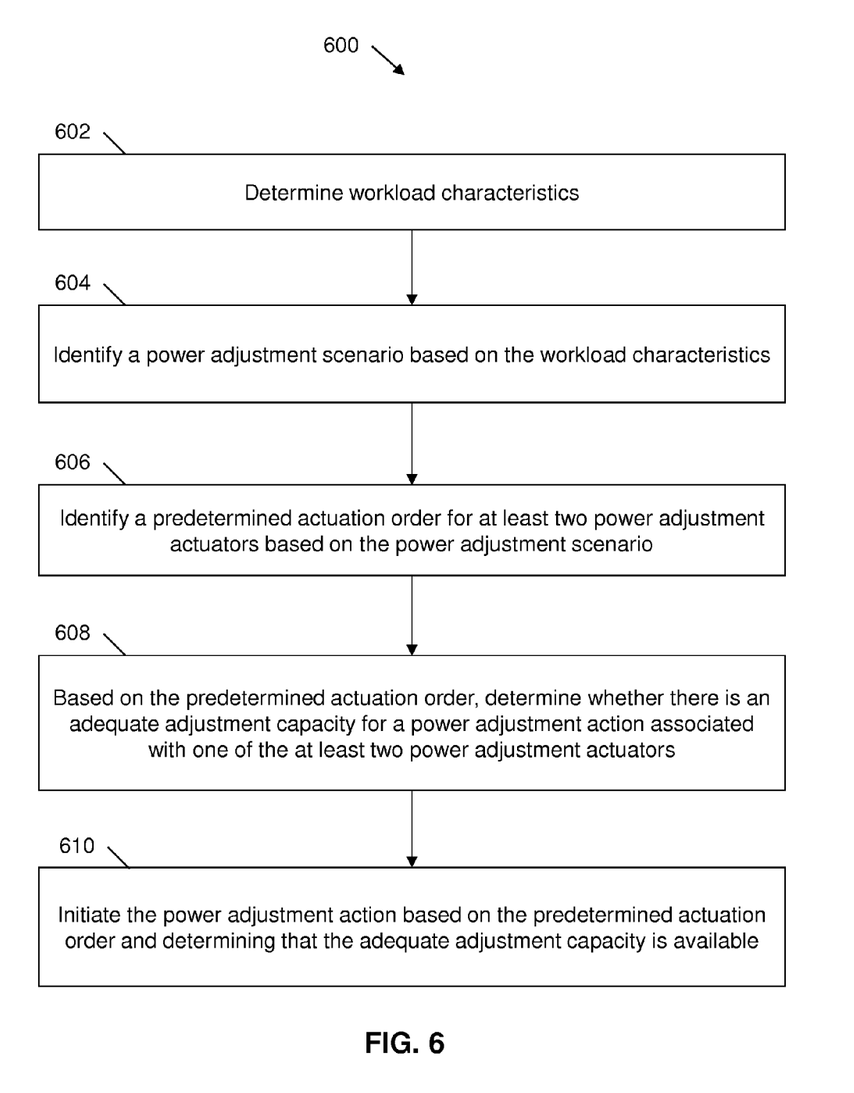
FIG. 6 is a high-level process flow diagram for power management of a multi-core processing system in accordance with an embodiment.

FIG. 6 depicts a high-level process flow diagram for power management of a multi-core processing system in accordance with an embodiment. Process 600 of FIG. 6 is a method that can be performed by the PAMPA controller 122 of FIG. 1, the PAMPA controller 222 of FIG. 2, or other configurations (not depicted). For ease of explanation, the process 600 is described in reference to the PAMPA controller 122 of the multi-core processing system 100 FIG. 1 and further in reference to FIGS. 3-5. At block 602, workload characteristics in the multi-core processing system 100 of FIG. 1 are determined. Examples of workload characteristics can include individually or any combination of at least one of: a level of processor core utilization 144, a level of memory system activity 146, or a level of cache system activity 150. The level of processor core utilization 144 may be provided to the PAMPA controller 122 or otherwise derived by the PAMPA controller 122. The level of memory system activity 146 of the memory system 148 may be provided to the PAMPA controller 122 or otherwise derived by the PAMPA controller 122. The level of cache system activity 150 of the cache system 152 can be provided to the PAMPA controller 122 or otherwise derived by the PAMPA controller 122. Other activity level indicators known in the art can also or alternatively be used to determine workload characteristics in the multi-core processing system 100.

At block 604, a power adjustment scenario is identified by the PAMPA controller 122 based on the workload characteristics. For example, the power adjustment scenario may indicate a high level of utilization such as the first power adjustment scenario 300 of FIG. 3, a partially high level of utilization with at least one but not all of the processor cores 108 in the power management group 110 being highly utilized as in the second power adjustment scenario 400 of FIG. 4, or a very low level of utilization as in the third power adjustment scenario 500 of FIG. 5.

At block 606, the PAMPA controller 122 identifies a predetermined actuation order for at least two power adjustment actuators 124 based on the power adjustment scenario. For example, actions taken and the actuation order for the first power adjustment scenario 300 may be different than for the second or third power adjustment scenarios 400, 500.

At block 608, based on the predetermined actuation order, the PAMPA controller 122 determines whether there is an adequate adjustment capacity for a power adjustment action associated with one of at least two power adjustment actuators 124. Before making a power adjustment action for a power adjustment actuator 124, an adjustment capacity check can ensure that there is sufficient margin for effected resources, such as available processor cores 108 and operating frequency increase/decrease headroom.

At block 610, the power adjustment action is initiated based on the predetermined actuation order and determining that the adequate adjustment capacity is available. The PAMPA controller 122 may also determine whether there is a second adequate adjustment capacity for a second power adjustment action associated with a second one of the power adjustment actuators 124 based on determining that there is an inadequate adjustment capacity for the power adjustment action of the power adjustment scenario. As an example, if there is insufficient capacity to support core unfolding as a first desired action, then a second check can be for operating frequency capacity before adjusting the operating frequency.

Figure 7:
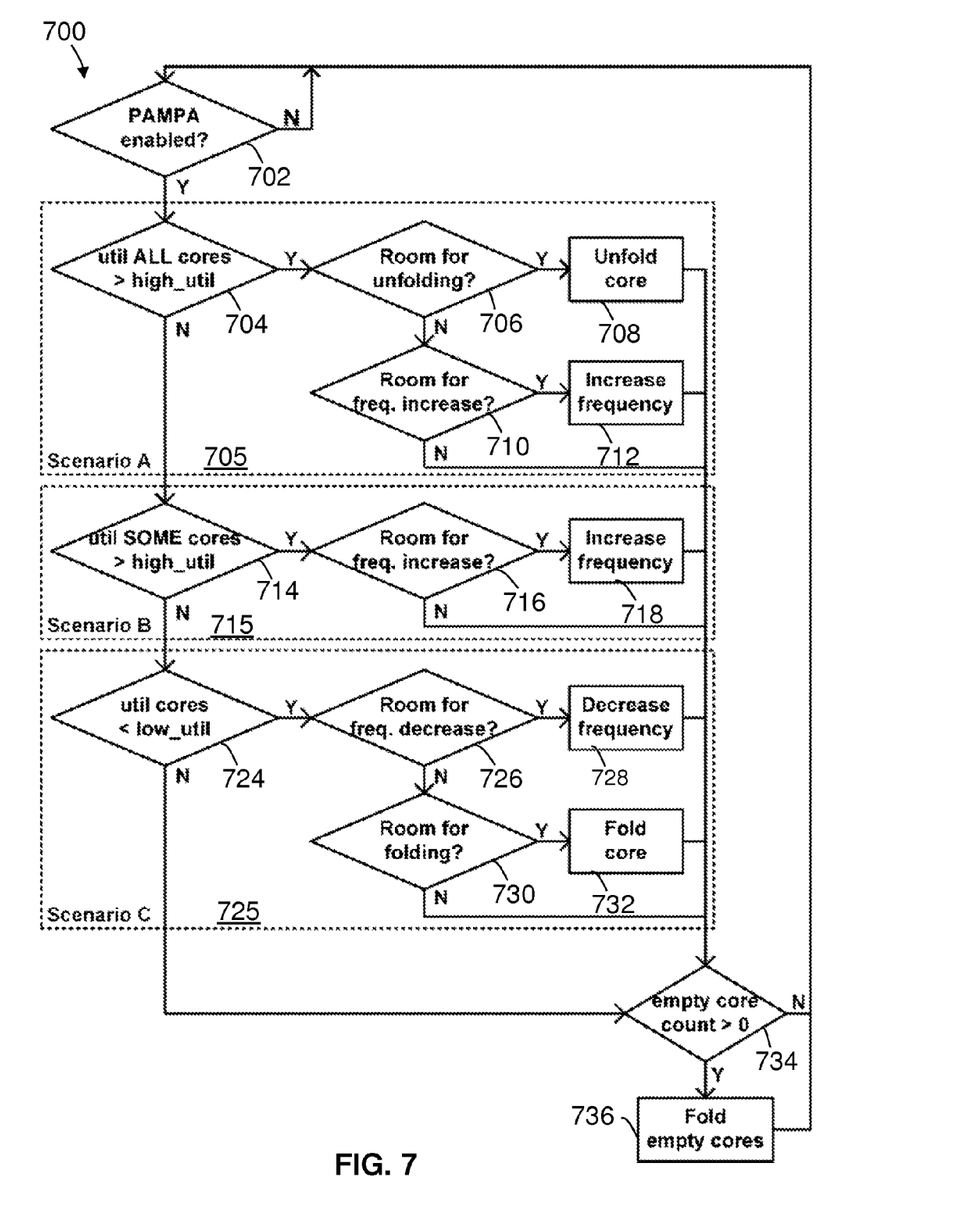
FIG. 7 is a detailed example of a process flow diagram for power management of a multi-core processing system in accordance with an embodiment.

FIG. 7 is a detailed example of a process flow diagram for power management of a multi-core processing system in accordance with an embodiment. A process 700 of FIG. 7 is a method that can be performed by the PAMPA controller 122 of FIG. 1, the PAMPA controller 222 of FIG. 2, or other configurations (not depicted). For ease of explanation, the process 700 is described in reference to the PAMPA controller 122 of the multi-core processing system 100 FIG. 1 and further in reference to FIGS. 3-5.

At block 702, an enablement check is performed to ensure that updates can be supported. For example, a stability check can be performed relative to a stability threshold to determine whether a current execution phase is stable. A power adjustment action may only be initiated based on determining that the current execution phase is stable. The stability check can monitor for variations in the level of processor core utilization 144 over a period of time. Alternatively, the stability threshold can be determined relative to memory system activity 146 or another parameter indicative of stability. The stability check can be performed at a monitoring interval, and the level of processor core utilization 144 may be used as workload characteristics including an average value spanning multiple iterations of the monitoring interval. For example, the monitoring interval can be every T milliseconds and the average value can be calculated over a configurable history length H, e.g., H iterations of T milliseconds. When using multiple samples of the level of processor core utilization 144, the stability threshold may be determined by comparing a standard deviation of the level of processor core utilization 144 to the average value of the level of processor core utilization 144 multiplied by an enabling threshold K (e.g., an acceptable percentage of variation) as the stability threshold. Stability calculations can be performed on a per processor core 108 basis.

At block 704, when the PAMPA controller 122 is enabled and the execution phase is stable, a further check identifies a first power adjustment scenario 705 (e.g., the first power adjustment scenario 300 of FIG. 3), based on determining that the level of processor core utilization 144 is greater than a high utilization threshold for all processor cores 108 in a power management group 110. If all the turned-on processor cores 108 are highly utilized, an executing application may be either traversing a single-thread-performance bound or a throughput bound execution phase. In other words, there are two choices in this example: to scale frequency up or to unfold and turn on one or more of the processor cores 108. The PAMPA controller 122 may prioritize unfolding and turning on processor cores 108 over frequency scaling based on a predetermined actuation order for the first power adjustment scenario 705. If all of the turned-on processor cores 108 are highly-utilized, applications may benefit more from unfolding an extra processor core 108 than from scaling frequency up. If all the processor cores 108 are already unfolded and turned-on, the PAMPA controller 122 can increase frequency instead.

Accordingly, at block 706 based on identifying the first power adjustment scenario 705, the PAMPA controller 122 determines whether adequate adjustment capacity for workload spreading exists, and if so, at block 708, the core folding actuator 138 is used to spread a workload (e.g., one or more threads 120) of at least one processor core 108 into at least one other processor core 108 having adequate adjustment capacity (e.g., turn on a processor core 108 and shift one or more threads 120 into the newly turned-on processor core 108). The CF actuator 138 may be used in combination with the PCPG actuator 140 to spread a workload and turn on a processor core 108.

Based on identifying the first power adjustment scenario 705 and determining that inadequate adjustment capacity for workload spreading exists at block 706, a determination as to whether adequate capacity for increasing an operating frequency exists is made at block 710, and if so, the operating frequency of the processor cores 108 in the power management group 110 is increased at block 712 using the frequency adjustment actuator 130a, 130b.

If after the unfolding decision at block 706, the just-enabled processor cores 108 remain empty or have low utilization, the executing application was not throughput bound but single-thread performance bound. In other words, first power adjustment scenario 705 becomes second power adjustment scenario 715 (where some but not all of the processor cores 108 are highly utilized, e.g., the second power adjustment scenario 400 of FIG. 4), and the PAMPA controller 122 can actuate accordingly in the next iteration of process 700.

At block 714, the second power adjustment scenario 715 is identified based on determining that the level of processor core utilization 144 is greater than the high utilization threshold for at least one but not all of the processor cores 108 in the power management group 110. In the second power adjustment scenario 715, the PAMPA controller 122 assumes that the executing application is traversing a single-thread-performance bound execution phase and increases frequency, if the operating frequency is not already at its maximum value.

At block 716, based on identifying the second power adjustment scenario 715 and determining that adequate capacity for increasing the operating frequency exists at block 716, the operating frequency of the processor cores 108 in the power management group 110 is increased at block 718 using the frequency adjustment actuator 130a, 130b.

A further scenario for power adjustment is that all the turned-on processor cores 108 are either lightly utilized or empty. In this case, the PAMPA controller 122 may assume that it is safe to reduce operating frequency or, if the operating frequency is already at its minimum value, to fold and power off processor cores 108. The PAMPA controller 122 can prevent frequency reduction and core folding even if just one thread 120 presents high utilization to avoid severe performance degradation. Therefore, a third power adjustment scenario 725 may perform frequency reduction or core folding only if all turned-on processor cores 108 have low utilization (e.g., the third power adjustment scenario 500 of FIG. 5).

At block 724, the third power adjustment scenario 725 is identified based on determining that the level of processor core utilization 144 is less than a low utilization threshold for all of the processor cores 108 in the power management group 110. At block 726, based on identifying the third power adjustment scenario 725, the PAMPA controller 122 determines whether adequate capacity for decreasing the operating frequency exists, and if so, the operating frequency of the processor cores 108 in the power management group 110 is decreased at block 728 using the frequency adjustment actuator 130a, 130b.

Based on identifying the third power adjustment scenario 725 and determining that inadequate capacity for decreasing the operating frequency exists at block 726, a determination as to whether adequate adjustment capacity for workload consolidation exists is made at block 730, and if so, a workload (e.g., one or more threads 120) of at least one processor core 108 is consolidated at block 732 using the CF actuator 138. The CF actuator 138 may be used in combination with the PCPG actuator 140 for workload consolidation and to turn off empty processor cores 108.

After evaluating the three power adjustment scenarios 705, 715, 725, the PAMPA controller 122 can also fold and turn off empty processor cores 108, using for example, the CF actuator 138 in combination with the PCPG actuator 140. This action may be complementary and independent from the treatment of the three power adjustment scenarios 705, 715, 725. In an embodiment, all but one of the empty processor cores 108 are turned off. Keeping one empty processor core 108 turned on can help to absorb temporary utilization peaks and prevent the PAMPA controller 122 from entering into unstable situations. For example, turning all empty processor cores 108 off may convert the second power adjustment scenario 715 into the first power adjustment scenario 705 and, after that, the PAMPA controller 122 may convert the first power adjustment scenario 705 into the second power adjustment scenario 715 again by unfolding processor cores 108. This ping-pong behavior between two power adjustment scenarios can be prevented by keeping one empty processor core 108 turned on.

At block 734, the PAMPA controller 122 determines whether there is at least one processor core 108 including less than an empty threshold amount of utilization. A workload (e.g., one or more threads 120) of the at least one processor core 108 having less than the empty threshold amount of utilization can be consolidated at block 736 to reduce a total number of active processor cores 108. The high utilization threshold and the low utilization threshold may be configurable parameters, where the high utilization threshold is greater than the low utilization threshold. The empty threshold amount of utilization can also be a configurable parameter. The thresholds can be determined by benchmark testing particular workloads and system configurations. In one example, the high utilization threshold was 80%, the low utilization threshold was 70%, and the empty threshold amount of utilization was 10%. In other examples, the high utilization threshold varied between 80% and 90%, and the low utilization threshold varied between 70% and 80%. Again, optimal values for the thresholds can vary beyond these examples based on system and workload characteristics.

Technical effects and benefits include coordinating power management for multiple power adjustment actuators in a multi-core processing system. Identifying particular power adjustment scenarios and adequate adjustment capacity enables power adjustment actions to be optimally sequenced and reduces risks of conflicts between the power adjustment actuators.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon, e.g., stored in memory system 148 of FIGS. 1 and 2.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for power management of a multi-core processing system, the method comprising:
    determining workload characteristics in the multi-core processing system;
    identifying a power adjustment scenario based on the workload characteristics;
    identifying a predetermined actuation order for at least two power adjustment actuators based on the power adjustment scenario;
    based on the predetermined actuation order, determining whether there is an adequate adjustment capacity for a power adjustment action associated with one of the at least two power adjustment actuators; and
    initiating the power adjustment action based on the predetermined actuation order and determining that the adequate adjustment capacity is available.

2. The method of claim 1, wherein the workload characteristics comprise at least one of a level of processor core utilization, a level of memory system activity, or a level of cache system activity.

3. The method of claim 1, further comprising:
    determining whether there is a second adequate adjustment capacity for a second power adjustment action associated with a second of the at least two power adjustment actuators based on determining that there is an inadequate adjustment capacity for the power adjustment action of the power adjustment scenario.

4. The method of claim 1, further comprising:
    determining whether there is at least one processor core comprising less than an empty threshold amount of utilization; and
    consolidating a workload of the at least one processor core having less than the empty threshold amount of utilization to reduce a total number of active processor cores.

5. The method of claim 1, further comprising:
    performing a stability check relative to a stability threshold to determine whether a current execution phase is stable; and
    initiating the power adjustment action based on determining that the current execution phase is stable.

6. The method of claim 5, further comprising:
    performing the stability check at a monitoring interval; and
    determining a level of processor core utilization as the workload characteristics comprising an average value spanning multiple iterations of the monitoring interval.

7. The method of claim 1, wherein identifying the power adjustment scenario comprises:
    identifying a first power adjustment scenario based on determining that a level of processor core utilization is greater than a high utilization threshold for all processor cores in a power management group;
    identifying a second power adjustment scenario based on determining that the level of processor core utilization is greater than the high utilization threshold for at least one but not all of the processor cores in the power management group; and
    identifying a third power adjustment scenario based on determining that the level of processor core utilization is less than a low utilization threshold for all of the processor cores in the power management group.

8. The method of claim 7, wherein the at least two power adjustment actuators comprise a core folding actuator and a frequency adjustment actuator, and further wherein:
    based on identifying the first power adjustment scenario and determining that adequate adjustment capacity for workload spreading exists, using the core folding actuator to spread a workload of at least one processor core into at least one other processor core having the adequate adjustment capacity;
    based on identifying the first power adjustment scenario and determining that inadequate adjustment capacity for workload spreading exists and that adequate capacity for increasing an operating frequency exists, increasing the operating frequency of the processor cores in the power management group using the frequency adjustment actuator;
    based on identifying the second power adjustment scenario and determining that adequate capacity for increasing the operating frequency exists, increasing the operating frequency of the processor cores in the power management group using the frequency adjustment actuator;
    based on identifying the third power adjustment scenario and determining that adequate capacity for decreasing the operating frequency exists, decreasing the operating frequency of the processor cores in the power management group using the frequency adjustment actuator; and based on identifying the third power adjustment scenario and determining that inadequate capacity for decreasing the operating frequency exists and that adequate adjustment capacity for workload consolidation exists, consolidating a workload of at least one processor core using the core folding actuator.

9. A multi-core processing system comprising:
a plurality of processor cores;
at least two power adjustment actuators; and
a power-aware management of processor actuators (PAMPA) controller operably coupled to the at least two power adjustment actuators and configured to:
  determine workload characteristics in the multi-core processing system;
  identify a power adjustment scenario based on the workload characteristics;
  identify a predetermined actuation order for at least two power adjustment actuators based on the power adjustment scenario;
  based on the predetermined actuation order, determine whether there is an adequate adjustment capacity for a power adjustment action associated with one of the at least two power adjustment actuators; and
  initiate the power adjustment action based on the predetermined actuation order and a determination that the adequate adjustment capacity is available.

10. The multi-core processing system of claim 9, wherein the PAMPA controller is further configured to determine whether there is a second adequate adjustment capacity for a second power adjustment action associated with a second of the at least two power adjustment actuators based on determining that there is an inadequate adjustment capacity for the power adjustment action of the power adjustment scenario.

11. The multi-core processing system of claim 9, wherein the PAMPA controller is further configured to:
  determine whether there is at least one processor core comprising less than an empty threshold amount of utilization; and
  consolidate a workload of the at least one processor core having less than the empty threshold amount of utilization to reduce a total number of active processor cores.

12. The multi-core processing system of claim 9, wherein the PAMPA controller is further configured to:
  perform a stability check relative to a stability threshold to determine whether a current execution phase is stable; and
  initiate the power adjustment action based on determining that the current execution phase is stable.

13. The multi-core processing system of claim 12, wherein the PAMPA controller is further configured to:
  perform the stability check at a monitoring interval; and
  determine a level of processor core utilization as the workload characteristics comprising an average value spanning multiple iterations of the monitoring interval.

14. The multi-core processing system of claim 9, wherein identification of the power adjustment scenario comprises:
  identifying a first power adjustment scenario based on determining that a level of processor core utilization is greater than a high utilization threshold for all processor cores in a power management group;
  identifying a second power adjustment scenario based on determining that the level of processor core utilization is greater than the high utilization threshold for at least one but not all of the processor cores in the power management group; and
  identifying a third power adjustment scenario based on determining that the level of processor core utilization is less than a low utilization threshold for all of the processor cores in the power management group.

15. The system of claim 14, wherein the at least two power adjustment actuators comprise a core folding actuator and a frequency adjustment actuator, and further wherein:
  based on identifying the first power adjustment scenario and determining that adequate adjustment capacity for workload spreading exists, using the core folding actuator to spread a workload of at least one processor core into at least one other processor core having the adequate adjustment capacity;
  based on identifying the first power adjustment scenario and determining that inadequate adjustment capacity for workload spreading exists and that adequate capacity for increasing an operating frequency exists, increasing the operating frequency of the processor cores in the power management group using the frequency adjustment actuator;
  based on identifying the second power adjustment scenario and determining that adequate capacity for increasing the operating frequency exists, increasing the operating frequency of the processor cores in the power management group using the frequency adjustment actuator;
  based on identifying the third power adjustment scenario and determining that adequate capacity for decreasing the operating frequency exists, decreasing the operating frequency of the processor cores in the power management group using the frequency adjustment actuator; and
  based on identifying the third power adjustment scenario and determining that inadequate capacity for decreasing the operating frequency exists and that adequate adjustment capacity for workload consolidation exists, consolidating a workload of at least one processor core using the core folding actuator.

16. A computer program product for power management of a multi-core processing system, the computer program product comprising:
a non-transitory storage medium readable by a processing circuit and storing instructions for execution by the processing circuit to:
  determine workload characteristics in the multi-core processing system;
  identify a power adjustment scenario based on the workload characteristics;
  identify a predetermined actuation order for at least two power adjustment actuators based on the power adjustment scenario;
  based on the predetermined actuation order, determine whether there is an adequate adjustment capacity for a power adjustment action associated with one of the at least two power adjustment actuators; and
  initiate the power adjustment action based on the predetermined actuation order and a determination that the adequate adjustment capacity is available.

17. The computer program product of claim 16, wherein the instructions for execution by the processing circuit are further configured to:
  determine whether there is at least one processor core comprising less than an empty threshold amount of utilization; and consolidate a workload of the at least one processor core having less than the empty threshold amount of utilization to reduce a total number of active processor cores.

18. The computer program product of claim 16, wherein the instructions for execution by the processing circuit are further configured to:

perform a stability check relative to a stability threshold to determine whether a current execution phase is stable; and initiate the power adjustment action based on determining that the current execution phase is stable.

19. The computer program product of claim 16, wherein identification of the power adjustment scenario comprises:

identifying a first power adjustment scenario based on determining that a level of processor core utilization is greater than a high utilization threshold for all processor cores in a power management group;

identifying a second power adjustment scenario based on determining that the level of processor core utilization is greater than the high utilization threshold for at least one but not all of the processor cores in the power management group; and identifying a third power adjustment scenario based on determining that the level of processor core utilization is less than a low utilization threshold for all of the processor cores in the power management group.

20. The computer program product of claim 19, wherein the at least two power adjustment actuators comprise a core folding actuator and a frequency adjustment actuator, and further wherein:

based on identifying the first power adjustment scenario and determining that adequate adjustment capacity for workload spreading exists, using the core folding actuator to spread a workload of at least one processor core into at least one other processor core having the adequate adjustment capacity;

based on identifying the first power adjustment scenario and determining that inadequate adjustment capacity for workload spreading exists and that adequate capacity for increasing an operating frequency exists, increasing the operating frequency of the processor cores in the power management group using the frequency adjustment actuator;

based on identifying the second power adjustment scenario and determining that adequate capacity for increasing the operating frequency exists, increasing the operating frequency of the processor cores in the power management group using the frequency adjustment actuator;

based on identifying the third power adjustment scenario and determining that adequate capacity for decreasing the operating frequency exists, decreasing the operating frequency of the processor cores in the power management group using the frequency adjustment actuator; and based on identifying the third power adjustment scenario and determining that inadequate capacity for decreasing the operating frequency exists and that adequate adjustment capacity for workload consolidation exists, consolidating a workload of at least one processor core using the core folding actuator.

\* \* \* \* \*